3,526,531
METHOD FOR MAKING MICROPOROUS
SHEET MATERIAL
Kohin Asano, Takatsuki, Kojiro Sagi, Takarazuka, Shigeru Kawase, Settsu, Tohru Kitazawa, Osaka, and Hiroo Ohba, Nishinomiya, Japan, assignors to Kanegafuchi Boseki Kabushiki Kaisha, a corporation of Japan
No Drawing. Filed Nov. 21, 1967, Ser. No. 684,646
Claims priority, application Japan, Dec. 1, 1966, 41/79,100
Int. Cl. B44d 1/44; B32b 27/40
U.S. Cl. 117—62.2  6 Claims

ABSTRACT OF THE DISCLOSURE

The method consists of coating a base material with a solution of film forming synthetic polymer comprising polyurethane dissolved in a water-miscible organic solvent. The coated base material is then treated with an aqueous coagulating liquid to coagulate the polymer followed by the steps of washing and drying. The aqueous coagulating liquid contains at least one water soluble salt selected from the group consisting of inorganic and organic salts of lithium, sodium, potassium, calcium, aluminum, ammonium, magnesium, copper, iron, zinc and manganese, wherein the concentration of said salt is from 10 g./l. to saturation at 30° C.

---

This invention relates to an improved process for making a tough and soft polyurethane sheet material having a uniform microporous structure and high in the moisture-permeability.

When a layer of an organic solvent solution of film forming synthetic polymer consisting of or mainly of polyurethane is introduced directly into water, the surface of the layer in contact with water will be quickly coagulated to be a compact or dense structure. However, the coagulation and regeneration of the interior of the polyurethane layer will be delayed. Thus, large voids will be likely to be produced in said interior, while the surface will be so compact or dense that it will be difficult to obtain uniform microporous structure throughout the layer. The resulting sheet material is poor is gas-permeability as a whole and is not satisfactory as a synthetic leather surface layer.

In this respect, it has already been described in Belgian Pat. No. 626,816 specification that, when a polyurethane solution is merely coagulated in water, no uniform microporous film having a moisture-permeability desired for a synthetic leather surface layer will be obtained unless any of the following additional measures is taken:

(a) exposing the layer of the polymer solution to a moistened atmosphere of a controlled relative humidity for a certain period of time before the layer is immersed in a nonsolvent (e.g. water);
(b) adding to the polymer solution water or any other non-solvent for the polymer in an amount carefully adjusted to convert said polymer solution to a colloid dispersion but not to cause gelling;
(c) adding and mixing water or any other non-solvent for the polymer into the polymer solution so that the polymer is separated as a gel, which is then used for coating.

In the above mentioned process (a), there are disadvantages that a strictly controlled atmosphere is required and that a long time is required for the coagulation of a coating film of any thickness. Further, not only the relative humidity but also the temperature must be controlled and it is difficult, on an industrial scale, to control the atmosphere to obtain homogeneous, uniform microporous films. Further, for example, it takes several hours to well moisten and coagulate in such moisture controlled atmosphere a layer (0.6 mm. thickness) dimethyl formamide solution containing 20% of a polyurethane. It is also difficult to determine the proper degree of coagulation.

The above mentioned process (b) is disclosed in detail, for example, in Belgian Pat. No. 614,056. A considerably good microporous sheet is obtained by this process. However, in preparing the so-called colloid dispersion just before substantial gelling of said polymer solution, the resulting colloid dispersion will be greatly influenced by the concentration and temperature of said polymer solution to be used, the amount of the non-solvent (such as, for example, water) to be added thereto and the method of the addition of the non-solvent that, it will be necessary to very carefully adjust and control the optimum conditions. Therefore, it is difficult to industrially practice said process.

The process (c) is disclosed for example in Belgian Pat. No. 624,250. However, the step of separating the gel is complicated and the control and adjustment of the proper concentration and viscosity of the gelled substance are difficult.

Further, in case of the above mentioned processes (b) and (c), the strength of the resulting microporous film will tend to reduce.

In order to overcome these drawbacks in conventional methods we have made extensive experiments and researches, and have found that a tough and soft porous sheet material high in the gas-permeability and having uniform microporous structure can be industrially easily produced by applying a solution of a polymer consisting of or mainly of a polyurethane in a water-miscible organic solvent, to a base or substrate material such as fibrous mat (e.g. non-woven fabric or felt), fabric (woven or knit), film or plate of synthetic resin or inorganic material (metal, glass, etc.), immersing the same in an aqueous solution of at least one water-soluble salt of a metal selected from the group consisting of lithium, sodium, potassium, calcium, aluminum, ammonium, magnesium, copper, iron, zinc and manganese so as to coagulate the polymer, and then washing with water and drying.

In carrying out the present invention, any of conventional film forming polyurethanes which are well known in the art may be used. Generally, for the production of such polyurethane, a prepolymer is prepared by reacting an organic diisocyanate compound with a polyalkylene ether glycol or a polyester having terminal hydroxyl radicals. The preopolymer is then chain-extended with a chain extender having two reactive hydrogen atoms such as a diamine, diol or polyol to form polyurethane elastomer.

The organic diisocyanate may be an aromatic, aliphatic or alicyclic diisocyanate or a mixture of them such as, for example, toluylene-2,4-diisocyanate, toluylene-2,6-diisocyanate, diphenyl methane - 4,4' - diisocyanate, 1,5-naphthylene diisocyanate, hexamethylene diisocyanate or paraxylene diisocyanate.

The polyalkylene ether glycol is, for example, polyethylene ether glycol, polypropylene ether glycol, polytetramethylene ether glycol or polyhexamethylene ether glycol or a copolymer or mixture of them. Further, for the polyol may be used glycerine or trimethylol propane.

The polyester which may be used is a polycondensate of an organic acid and a glycol. Preferable glycol is such polyalkylene glycol as ethylene glycol, propylene glycol, tetramethylene glycol or hexamethylene glycol, such cyclic glycol as cyclohexane diol or such aromatic glycol as xylylene glycol. Further, the acid to be used may be succinic acid, adipic acid, sebacic acid or terephthalic acid.

For the chain extender may be used such diamine as, for example, hydrazine, ethylene diamine, methylene di-orthochloroaniline.

If desired, a catalyst such as triethylamine, triethylene diamine, N-ethyl morpholine, dibutyl tin dilaurate or cobalt naphthenate may be used in preparing the polyurethane elastomer.

For polyester having terminal hydroxyl radicals may be used such as is obtained by ring-opening-polymerizing a lactone in the presence of a small amount of a glycol or such as is obtained by polycondensing an excess diol with dicarboxylic acid and is of an average molecular weight of about 500 to 3000. For the lactone, it is preferable to employ $\delta$-valerolactone, $\gamma$-butyrolactone or $\epsilon$-caprolactone.

If desired, a small amount of one or more of other polymers soluble in the solvent, such as polyvinyl chloride, polyvinyl alcohol, polyacrylonitrile and polyacrylic acid esters and their copolymers may be added to the above mentioned polyurethane solution.

In the present invention, the above mentioned polyurethane is used as a solution. The solvent for the polymer must be selected from those which are miscible with water and are able to be extracted with an aqueous solution of a salt. Examples of these solvents are any one or a mixture of any of N,N'-dimethyl formamide, dimethyl sulfoxide, tetrahydrofuran, tetramethyl urea, N,N'-dimethyl acetamide, dioxane and butylcarbinol. Among them, N,N'-dimethyl formamide and dimethyl sulfoxide are most preferable. Further, any of ketones which alone are not good solvents for the polyurethane but are well miscible with the solution, such as acetone and methyl ethyl ketone can be used as a diluent in so far as not coagulating said polymer.

The feature of the process of the present invention is to first apply a solution of a polymer consisting of or mainly of a polyurethane to the surface of the above mentioned base material and then immerse it in an aqueous solution of a water-soluble salt of the above mentioned metal. When so immersed, the polymer is continuously uniformly coagulated and regenerated from the surface of the layer toward the interior. In this case, a very complicated coagulating phenomenon will occur, involving penetration of the water and salt into the polymer solution layer, the coagulation of said polymer, the separation of the solvent and the dissolution of the solvent into the aqueous salt solution; thereby the coagulating velocity of the surface of the polymer solution layer in contact with the coagulating solution will be harmonized and finally a film having uniform micropores in the interior of the layer will be formed. Therefore, such operations and steps as in the above mentioned conventional processes are not required.

While the concentration of the salt in the aqueous solution may vary over a wide range, e.g. from about 10 g./l. to saturation (at 30° C.), it has been found that a lower concentration is preferable when the salt is higher in hygroscopicity and that a higher concentration is preferable when the salt is lower in hygroscopicity. For example, in case of calcium chloride, a concentration of about 70 g./l. at 30° C. (about 1/10 of the saturation) is preferable. While, for sodium chloride, a concentration of 300 g./l. at 30° C. (near the saturation) is most preferable. If the concentration is too low, the coagulation will become close to that in water alone, with a result that the film will be so dense or compact at the surface and no desirable gas-permeability will be obtained.

The salts which can be used in the present invention are water-soluble inorganic or organic salts of lithium, sodium, potassium, magnesium, calcium, aluminum, zinc, manganese, copper, iron and ammonium. Any one or a mixture of two or more of these salts may be used. Preferable salts are hydrochlorides, sulfates, nitrates, phosphates, carbonates, borates, sulfonates, acetates and benzoates.

As mentioned before the salt concentration in the coagulating bath varies depending on the concentration, chemical structure, average molecular weight and content of the polyurethane. However, preferable concentrations (at 30° C.) for typical salts are as follows:

TABLE 1

| Salts: | Proper concentration, g./l. |
|---|---|
| $LiCl$ | 350–450 |
| $Li_2SO_4$ | 200–350 |
| $LiNO_3$ | 380–450 |
| $NaCl$ | 250–300 |
| $Na_2SO_4$ | 120–350 |
| $NaNO_3$ | 300–500 |
| $Na_2CO_3$ | 60–120 |
| $NaCOOCH_3$ | 250–350 |
| $KCl$ | 30–150 |
| $K_2SO_4$ | 120–180 |
| $KNO_3$ | 50–80 |
| $K_2CO_3$ | 50–150 |
| $MgCl_2$ | 30–60 |
| $MgSO_4$ | 60–80 |
| $Mg(NO_3)_2$ | 150–200 |
| $NH_4CO_3$ | 50–130 |
| $NH_4Cl$ | 30–130 |
| $(NH_4)_2SO_4$ | 150–350 |
| $NH_4NO_3$ | 300–500 |
| $(NH_4)_2CO_3$ | 50–180 |
| $(NH_4)_3PO_4$ | 200–350 |
| $ZnCl_2$ | 30–70 |
| $ZnSO_4$ | 150–200 |
| $MnSO_4$ | 150–370 |
| $MnCl_2$ | 100–270 |
| $AlCl_3$ | 30–80 |
| $Al_2(SO_4)_3$ | 50–250 |
| $FeSO_4$ | 50–150 |
| $CuSO_4$ | 50–100 |
| $CaCl_2$ | 50–150 |
| $Ca(NO_3)_2$ | 50–150 |

Among the above mentioned salts, most preferable are sodium sulfate, sodium carbonate, sodium sulfite, aluminum sulfate, ferrous sulfate, lithium nitrate, lithium sulfate, potassium sulfate, magnesium sulfate, ammonium sulfate, iron sulfate, zinc sulfate, sodium chloride and ammonium carbonate.

As seen from the acid radicals of these salts, generally sulfate, carbonates, hydrochlorides and nitrates are preferable and specifically sulfates and carbonates are most preferable.

Usually, an aqueous solution of a single salt is employed. However, if desired, a mixture of two or more of the salts may be employed. But suitably combining different salts, the coagulating activity of the solution may be controlled. Thus, for example, when a small amount of another synthetic polymer is mixed in the polyurethane elastomer solution or when the coagulating velocity by a certain salt solution is excessively high, the coagulating activity will be able to be adjusted by using a mixture of suitably selected two or more of the salts.

It is desirable and convenient that the coagulating bath temperature is at or near the normal temperature. However, in some cases, the coagulating activity of the aqueous salt solution may be adjusted by varying the temperature. Generally, with the same salt concentration, there is a tendency that, the lower the temperature, the lower the coagulating activity and that, the higher the temperature, the higher the coagulating velocity. Generally, it is preferable that the coagulating temperature is in the rang of 10 to 60° C., most preferably 20 to 50° C. If the temperature is lower than 10° C., the coagulating activity will be insufficient and the regenerated film will shrink and will become somewhat transparent. When the coagulating bath temperature is higher than 60° C. the coagulation will be so quick that the surface of the coagulated film will be likely to become undesirably dense or compact.

The concentration of the polymer in the polymer solution is in the range of 10 to 40% by weight, preferably 15 to 35% by weight. The proper viscosity of this solution is in the range of 500 to 100,000 centipoises.

We have further found that, when a certain amount of urea is added to the polymer solution, the resulting film is improved in the moisture permeability, without adversely affecting the advantages obtainable by the use of an aqueous coagulating bath of the salt explained before.

The effect of the use of a salt in the coagulating bath and the addition of urea would be apparent from the following comparative experiments: Thus, there was used a 35% polymer solution prepared by dissolving into dimethylformamide a polyurethane prepared from 1,4-butane diol adipate (molecular weight 2000) and diphenyl methane-4,4'-diisocyanate. The coating material was applied in a thin layer (0.6 mm.) on a glass plate.

The woven fabric, knit fabric or fibrous mat or sheet or other flexible substrate on which is formed the microporous polyurethane layer or film is useful as synthetic leather. The microporous film of polyurethane formed on such a sheet or plate as glass, metal or synthetic resin can be peeled off to form a film or sheet suitable as a surface layer of synthetic leather.

The application of the polymer solution to the base or substrate material may be conducted in any known manner, e.g. knife coating, roller coating, spray coating, etc.

If desired, the polymer solution may further contain a coloring material (dye, pigment, etc.), stabilizer, filler, etc.

The invention will be explained in more details with reference to the following examples in which all the parts and percentages are by weight unless otherwise specified.

The strength and elongation of the microporous film were measured in respect of a sample of a width of 2 cm. and a holding length of 5 cm. at a pulling velocity of 3 cm./min. with an Instron tester. The gas-permeability was measured by using an apparatus provided with a short pipe of a diameter of 3 cm. connected to an air reservoir of a capacity of 1 liter. Compressed air was introduced into the air reservoir and the pressure decrease within the reservoir due to leakage of air through the test film attached on the end of the pipe was measured against time. The values shown in the specification and examples are represented by the time (seconds) until the pressure in the air reservoir reduced from 5.5 kg./cm.$^2$ to 4.5 and 3.0 kg./cm.$^2$ Therefore, the lower the value, the higher the gas-permeability. The moisture-permeability was measured by the method of JIS 6429.

TABLE 3

| Method of coagulation | Thickness, mm. | Specific gravity | Tensile strength, (kg./mm.$^2$) | Elongation, percent | Gas permeability | | Moisture permeability mg./hr./cm.$^2$ |
|---|---|---|---|---|---|---|---|
| | | | | | 4.5 kg./cm.$^2$ | 3 kg./cm.$^2$ | |
| Invention I | 0.32 | 0.64 | 0.92 | 569 | 12 | 45 | 4.8 |
| Invention II | 0.32 | 0.58 | 0.91 | 540 | 4.3 | 48 | 8.4 |
| Conventional (a) | 0.31 | 0.71 | 0.89 | 552 | 33 | 114 | 2.0 |
| Conventional (b) | 0.31 | 0.66 | 0.64 | 455 | 10 | 35 | 4.7 |
| Conventional (c) | 0.34 | 0.62 | 0.52 | 331 | 8 | 34 | 4.1 |

Invention I: The coated layer was immersed for 5 min. in an aqueous solution (200 g./l.) of sodium sulfate at 25° C., and then washed with water and dried.
Invention II: Same as Invention I except that urea (20% by weight based on the polymer) was added to the polymer solution.
Conventional (a): The coated layer was left to stand for 10 hours in an atmosphere of relative humidity 70% at 25° C., and then washed with water and dried.
Conventional (b): A mixture of dimethylformamide and water (4:1) was added in an amount of 10% by weight to the polymer solution. The coated layer was immersed in water for coagulation, and then washed with water and dried.
Conventional (c): A mixture of dimethylformamide and water (4:1) was added in an amount of 30% by weight to the polymer solution. The formed gel was recovered and applied on the glass plate and coagulated in water, then washed with water and dried.

The amount of urea to be added to the polymer solution varies depending on the concentration of the polyurethane elastomer and the particular salt in the coagulating bath, but it is generally in the range of 1 to 100% by weight, preferably 10 to 50% by weight on the polyurethane. In case it is less than 1%, the coagulating rate will be comparatively low and the moisture-permeability of the resulting microporous film will reduce. When it is more than 100% by weight, the stability of the polyurethane solution will reduce, the rate of gelling will become excessively high and the quality of the resulting film will be adversey affected.

A large proportion of the added urea will dissolve out into the coagulating bath. Even if such urea is accumulated in the coagulating bath, the latter will be not adversely affected in the coagulating performance.

After the coagulation, the sheet or film material is washed with water or any other cheap inert liquid which is non-solvent to the polyurethane and miscible with the solvent used in forming the polymer solution. Examples of inert liquid are methyl alcohol or acetone. Water is most preferable for economy. When the coagulated layer is washed, any solvent, salt and urea (if added to the polymer solution) remaining in the layer is removed.

The subsequent drying may be conducted in any known manner and no special or unusual precaution is required.

EXAMPLE 1

105 parts of polyethylene adipate (average molecular weight 1050) having terminal —OH groups were dissolved in 200 parts of anhydrous dioxane, and 40.0 parts of methylene bis(4-phenyl isocyanate) were added thereto. The solution was kept in a nitrogen atmosphere at 80° C. for 2 hours to obtain a prepolymer and was then cooled to 30° C. To the resulting prepolymer solution were added 3.7 parts of ethylene glycol and 0.02 part of triethylene diamine together with 100 parts of anhydrous dioxane to conduct chain-extending reaction for 3 hours. Then the polymer solution was cooled and was poured into water to remove a greater part of the dioxane and was dried at 80° C. under a reduced pressure. The polymer was dissolved into N,N'-dimethyl formamide so as to be of a concentration of 30% by weight. The viscosity of this polymer solution was 45,000 centipoises at 30° C.

Then, to this polymer solution was added urea in various amounts are in the following table to prepare polymer solutions. Each solution was applied by knife-coating onto a glass plate so as to be 0.8 mm. thick. The coated glass plate was immersed into an aqueous coagulating bath containing 300 g./l. of sodium sulfate (300 g. of anhydrous sodium sulfate dissolved in 1 liter of water) or into water at 30° C. for 30 minutes to complete the coagulation of the polymer. The formed film was well washed with water to remove remaining urea, sodium sulfate and N,N'-dimethyl formamide and then air-dried at 100° C. for 5 minutes.

The results are shown in Table 3.

ferred into water at 30° C. The coagulated film of the polyurethane was peeled off, washed with water, and then

TABLE 3

| Polymer concentration, percent | Amount of urea per 100 parts of polyurethane | Coagulating bath (30° C.) | Structure of the cross-section | Thickness, mm. | Specific gravity | Strength kg./mm.$^2$ | Elongation, percent | Moisture-permeability, mg./hr./cm.$^2$ | Gas-permeability, 3.0 kg./cm.$^2$ |
|---|---|---|---|---|---|---|---|---|---|
| 30 | 9.0 | Water | Many voids | 0.47 | 0.49 | 0.55 | 431 | 5.0 | 51 |
| 30 | 3.3 | 300 g/l Na$_2$SO$_4$ | Microporous | 0.44 | 0.50 | 0.60 | 440 | 6.5 | 46 |
| 30 | 5.5 | 300 g/l Na$_2$SO$_4$ | do | 0.35 | 0.59 | 0.75 | 512 | 7.4 | 46 |
| 30 | 10 | 300 g/l Na$_2$SO$_4$ | do | 0.36 | 0.62 | 0.85 | 539 | 7.9 | 46 |
| 30 | 20 | 300 g/l Na$_2$SO$_4$ | do | 0.36 | 0.62 | 0.93 | 548 | 8.5 | 8.5 |
| 30 | 30 | 300 g/l Na$_2$SO$_4$ | do | 0.36 | 0.61 | 0.91 | 540 | 8.1 | 47 |
| 25 | 40 | 300 g/l Na$_2$SO$_4$ | do | 0.32 | 0.61 | 0.89 | 540 | 8.7 | 46 |
| 20 | 60 | 300 g/l Na$_2$SO$_4$ | do | 0.30 | 0.58 | 0.88 | 527 | 9.4 | 47 |
| 15 | 80 | 300 g/l Na$_2$SO$_4$ | do | 0.29 | 0.54 | 0.89 | 506 | 10.6 | 46 |
| 15 | 110 | 300 g/l Na$_2$SO$_4$ | Scattered voids | 0.30 | 0.51 | 0.54 | 465 | 8.6 | 46 |
| 15 | 100 | 300 g/l Na$_2$SO$_4$ | Microporous | 0.28 | 0.54 | 0.76 | 487 | 11.2 | 46 |
| 15 | 150 | 300 g/l Na$_2$SO$_4$ | Scattered voids | 0.30 | 0.50 | 0.56 | 471 | 9.6 | 46 |
| 30 | 0 | 300 g/l Na$_2$SO$_4$ | Microporous | 0.29 | 0.67 | 0.90 | 590 | 6.0 | 45 |

EXAMPLE 2

100 parts of the polyurethane elastomer prepared as in Example 1 were dissolved in N,N'-dimethyl formamide so as to be of a concentration of 30%. Then 20 parts of urea were added. The solution was applied onto a glass plate so as to be 0.6 mm. thick. The coated glass plate was immersed into a coagulating bath (30° C.) consisting of an aqueous solution of a salt or mixture of salts shown in the following table for 30 minutes to complete the coagulation of the polymer. The plate was then transferred into water at 30° C. The coagulated film of the polyurethane was peeled off, washed with water, and then dried with hot air at 105° C. for 5 minutes. The results are shown in Table 4.

TABLE 4

| Salts | Concentration, g./liter | Thickness, mm. | Specific gravity | Strength kg./mm.$^2$ | Elongation, percent | Moisture-permeability mg./hr./cm.$^2$ |
|---|---|---|---|---|---|---|
| LiCl | 380 | 0.26 | 0.70 | 1.05 | 561 | 8.4 |
| Li$_2$SO$_4$ | 300 | 0.29 | 0.64 | 0.94 | 523 | 8.9 |
| LiNO$_3$ | 380 | 0.30 | 0.63 | 0.89 | 498 | 9.1 |
| LiCH$_3$COO | 280 | 0.23 | 0.85 | 1.12 | 603 | 7.0 |
| NaCl | 300 | 0.27 | 0.70 | 0.96 | 547 | 7.1 |
| Na$_2$SO$_4$ | 250 | 0.29 | 0.64 | 0.96 | 539 | 8.9 |
| NaNO$_3$ | 380 | 0.29 | 0.63 | 0.94 | 534 | 9.0 |
| Na$_2$CO$_3$ | 100 | 0.26 | 0.71 | 0.99 | 581 | 8.3 |
| NaCH$_3$COO | 250 | 0.23 | 0.84 | 1.15 | 615 | 7.3 |
| KCl | 120 | 0.27 | 0.66 | 0.89 | 519 | 7.9 |
| K$_2$SO$_4$ | 150 | 0.28 | 0.62 | 0.91 | 528 | 8.8 |
| KNO$_3$ | 80 | 0.28 | 0.60 | 0.91 | 533 | 8.3 |
| KCH$_3$COO | 180 | 0.25 | 0.71 | 0.99 | 541 | 8.0 |
| KC$_6$H$_5$COO | 200 | 0.24 | 0.75 | 1.03 | 585 | 7.1 |
| MgCl$_2$ | 60 | 0.25 | 0.70 | 0.98 | 547 | 6.2 |
| MgSO$_4$ | 120 | 0.29 | 0.63 | 0.92 | 530 | 8.9 |
| Mg(NO$_3$)$_2$ | 200 | 0.29 | 0.62 | 0.90 | 516 | 8.8 |
| NH$_4$Cl | 120 | 0.31 | 0.60 | 0.90 | 519 | 8.4 |
| (NH$_4$)$_2$SO$_4$ | 250 | 0.32 | 0.52 | 0.73 | 415 | 9.3 |
| NH$_4$NO$_3$ | 380 | 0.30 | 0.59 | 0.83 | 493 | 7.9 |
| (NH$_4$)$_2$CO$_3$ | 150 | 0.31 | 0.62 | 0.93 | 529 | 8.3 |
| NH$_4$CH$_3$COO | 200 | 0.27 | 0.68 | 0.92 | 527 | 7.4 |
| AlCl$_3$ | 50 | 0.30 | 0.58 | 0.74 | 490 | 8.0 |
| Al$_2$(SO$_4$)$_3$ | 200 | 0.32 | 0.53 | 0.69 | 453 | 9.6 |
| CuSO$_4$ | 100 | 0.31 | 0.59 | 0.79 | 503 | 8.3 |
| ZnCl$_2$ | 50 | 0.27 | 0.64 | 0.94 | 519 | 7.9 |
| ZnSO$_4$ | 180 | 0.29 | 0.63 | 0.92 | 515 | 8.6 |
| MnCl$_2$ | 250 | 0.31 | 0.60 | 0.90 | 509 | 8.0 |
| MnSO$_4$ | 300 | 0.30 | 0.63 | 0.94 | 527 | 8.7 |
| FeSO$_4$ | 150 | 0.30 | 0.62 | 0.91 | 514 | 9.3 |
| CaCl$_2$ | 100 | 0.27 | 0.67 | 0.87 | 508 | 7.9 |
| Ca(CO$_3$)$_2$ | 100 | 0.29 | 0.61 | 0.91 | 521 | 7.9 |
| K$_2$SO$_4$ / KO$_3$COO | 120 / 150 | 0.26 | 0.70 | 1.02 | 574 | 7.7 |
| Na$_2$SO$_4$ / KNO$_3$ | 150 / 50 | 0.29 | 0.62 | 0.91 | 527 | 8.9 |
| Na$_2$SO$_4$ / K$_2$SO$_4$ | 150 / 150 | 0.27 | 0.66 | 0.98 | 536 | 9.0 |

EXAMPLE 3

Diphenyl methane - 4,4 - diisocyanate was reacted with 1,4-butane diol adipate (molecular weight; about 2000) to prepare a prepolymer. A solution of a polyurethane elastomer (concentration 35%, viscosity 25,500 centipoises) obtained by chain-extending said prepolymer in a dimethyl formamide solution was applied onto a glass plate so as to be about 0.6 mm. thick. The coated glass plate was then immersed in an aqueous solution of various salts shown in Table 5 at 30° C. for 10 minutes to complete the coagulation. Then the glass plate was transferred into water at the room temperature. The coagulated film was peeled off, washed with water for about 10 minutes and then air-dried at 100° C. for 10 minutes.

The results are as shown in Table 5.

coating onto the surface of a gas-permeable base cloth. The base cloth was 0.8 mm. in thickness and 0.47 in density and had been prepared by curing 1 part of a nonwoven fabric of nylon of 1.2 deniers with 1 part of a butadiene-acrylonitrile copolymer. The coated material was immersed directly in a coagulating bath of a solution of 180 g./l. of sodium sulfate at 30° C. After 5 minutes im-

TABLE 5

| Salts | Concentration, g./l. | Thickness mm. | Specific gravity | Strength kg./mm.$^2$ | Elongation, percent | Gas-permeability (seconds) | |
|---|---|---|---|---|---|---|---|
| | | | | | | 4.5 kg./cm.$^2$ | 3.0 kg./cm.$^2$ |
| NaCl | 280 | 0.29 | 0.71 | 0.94 | 598 | 18 | 59 |
| Na$_2$SO$_4$ | 200 | 0.32 | 0.64 | 0.92 | 569 | 12 | 45 |
| NaNO$_3$ | 400 | 0.32 | 0.68 | 1.07 | 499 | 24 | 96 |
| Na$_2$CO$_3$ | 70 | 0.34 | 0.58 | 0.75 | 530 | 8 | 26 |
| Na$_2$SO$_3$ | 150 | 0.30 | 0.60 | 0.88 | 498 | 14 | 51 |
| CaCl$_2$ | 80 | 0.32 | 0.63 | 0.98 | 582 | 19 | 69 |
| K$_2$SO$_4$ | 160 | 0.29 | 0.66 | 1.04 | 525 | 21 | 79 |
| MgSO$_4$ | 120 | 0.30 | 0.65 | 1.05 | 569 | 14 | 53 |
| ZnSO$_4$ | 220 | 0.29 | 0.69 | 1.06 | 573 | 31 | 101 |
| Al$_2$(SO$_4$)$_3$ | 200 | 0.30 | 0.61 | 0.92 | 549 | 4 | 15 |
| MnSO$_4$ | 360 | 0.29 | 0.65 | 1.07 | 590 | 28 | 94 |
| FeSO$_4$ | 110 | 0.33 | 0.62 | 0.82 | 530 | 11 | 42 |
| NH$_4$Cl | 30 | 0.35 | 0.59 | 0.88 | 564 | 22 | 76 |
| (NH$_4$)$_2$SO$_4$ | 300 | 0.32 | 0.64 | 1.13 | 570 | 9 | 34 |
| (NH$_4$)$_2$CO$_3$ | 150 | 0.31 | 0.65 | 1.01 | 542 | 7 | 31 |
| ZnSO$_4$ | 330 | 0.22 | 0.96 | 1.6 | 565 | 278 | 1,207 |
| Na$_2$SO$_4$ / Al$_2$(SO$_4$)$_3$ | 100 / 150 | 0.31 | 0.62 | 0.92 | 511 | 8 | 24 |
| Na$_2$CO$_3$ / Na$_2$SO$_4$ | 50 / 100 | 0.34 | 0.60 | 0.86 | 496 | 11 | 34 |
| NaCl / Na$_2$SO$_4$ | 100 / 100 | 0.31 | 0.66 | 0.95 | 561 | 15 | 52 |

EXAMPLE 4

A prepolymer obtained by reacting 104 parts of polybutylene adipate (average molecular weight 2080) having terminal —OH groups and 25 parts of methylene bis-(4-phenyl isocyanate) in a nitrogen gas atmosphere was dissolved in 270 parts of N,N'-dimethyl formamide at 30° C. and was cooled to 0° C. Then 38 parts of an N,N'-dimethyl formamide solution containing 3.0 parts of ethylene diamine were added to the prepolymer solution and the mixture was stirred to carry out chain-extending reaction. A 30% solution of the thus obtained polyurethane elastomer showed a viscosity of 28,000 centipoises at 30° C. With or without the addition of urea in an amount of 25 parts per 100 parts of the polyurethane, the polymer solution was applied so as to be 0.8 mm. thick by knife-coating onto a synthetic leather base. The base was prepared by impregnating 1 part of a nonwoven fabric of nylon with an aqueous emulsion consisting of 1 part of a butadiene-acrylonitrile copolymer, curing the same and smoothing the surface. The coated material was immersed in a coagulating bath consisting of an aqueous solution of 250 g./l. of sodium sulfate at 30° C. for 20 minutes. Thus a coagulated polyurethane film was deposited on the surface of the base. The whole structure was washed with water and dried. The surface film showed a microporous structure high in the uniformity. The results are shown in Table 6.

mersion, the base cloth was transferred into a warm water bath at 50° C. and was passed through squeezing rolls three times while being washed during about 5 minutes. Then it was dried in an air-dryer at 110° C. for 3 minutes while being tensioned to obtain a film having a microporous structure deposited on the nonwoven fabric of nylon.

A paint (acrylate-type) for leather was applied with a brush or sprayer onto the film and was dried. Further, a clear lacquer (nitrocellulose type) for leathers was sprayed on it for finishing. The resulting product was lustrous and had a leather-like feel. It was high in the strength, gas-permeability and moisture permeability as shown in Table 7.

TABLE 7

| Samples | Thickness, mm. | Weight, g./cm.$^2$ | Strength, kg./mm.$^2$ | Elongation, percent | Gas-permeability (seconds) | | Moisture-permeability, mg./hr./cm.$^2$ |
|---|---|---|---|---|---|---|---|
| | | | | | 4.5 kg./cm.$^2$ | 3.0 kg./cm.$^2$ | |
| Urea added | 1.14 | 530 | 0.96 | 13.90 | 63 | 240 | 6.0 |
| Urea not added | 1.14 | 528 | 0.94 | 13.90 | 61 | 238 | 4.0 |

What we claim is:

1. A method of making a microporous sheet material by coating a base material with a solution of film forming synthetic polymer comprising polyurethane dissolved in a water-miscible organic solvent, treating the coated base material with an aqueous coagulating liquid to coagulate the polymer, washing and drying the same, characterized in that the said aqueous coagulating liquid contains at least one water soluble salt selected from the group consisting of inorganic and organic salts of lithium, sodium, potassium, calcium, aluminum, ammonium, magnesium, copper, iron, zinc and manganese, wherein the concentration of said salt is from 10 g./l. to saturation at 30° C.

TABLE 6

| Samples | Thickness, mm. | Weight g./m.$^2$ | Apparent specific gravity | Strength, kg./mm.$^2$ | Elongation, percent | Young's modulus, kg./mm.$^2$ | Moisture-permeability, mg./hr./cm.$^2$ | Gas-permeability (sec.), 3.0 kg./cm.$^2$ |
|---|---|---|---|---|---|---|---|---|
| Urea added | 1.6 | 850 | 0.53 | 0.81 | 27 | 1.09 | 6.8 | 180 |
| Urea not added | 1.55 | 870 | 0.55 | 0.82 | 27 | 1.14 | 4.7 | 118 |

It is seen that even when no urea had been added to the coating material solution the resulting film showed a high gas-permeability and that, when urea was added, the moisture-permeability and gas-permeability further improved.

EXAMPLE 5

Each of the coating polymer solutions prepared in Example 4 was applied so as to be 0.6 mm. thick by knife- 2. A method as claimed in claim 1 wherein the polymer solution contains urea in a concentration range of 1 to 100% by weight based on the polymer in said solution.

3. A method as claimed in claim 1 wherein the salts are hydrochlorides, sulfates, nitrates, phosphates, carbonates, borates, sulfonates, acetates and benzoates.

4. A method as claimed in claim 1 wherein the salt is selected from the group consisting of sodium sulfate, sodium carbonate, sodium sulfite, aluminium sulfate, ferrous sulfate, lithium nitrate, lithium sulfate, potassium sulfate, magnesium sulfate, ammonium sulfate, iron sulfate, zinc sulfate, sodium chloride and ammonium carbonate.

5. A method as claimed in claim 1 wherein the temperature of the aqueous coagulating liquid is 10–60° C., preferably 20–50° C.

6. A method as claimed in claim 1 wherein the amount of urea in the polymer solution is 10–50% by weight based on the polymer in said solution.

References Cited

UNITED STATES PATENTS

| | | | |
|---|---|---|---|
| 2,871,218 | 1/1959 | Schollenberger | 260—45.4 |
| 2,919,205 | 12/1959 | Hart | 117—64 |
| 2,950,214 | 8/1960 | Smith | 117—62.2 |
| 3,100,721 | 8/1963 | Holden | 117—135.5 |
| 3,190,765 | 6/1965 | Yuan | 117—63 |
| 3,190,766 | 6/1965 | Yuan | 117—63 |
| 3,208,875 | 9/1965 | Holden | 117—63 X |
| 3,214,290 | 10/1965 | Larner et al. | 117—135.5 |
| 3,238,055 | 3/1966 | Brightwell | 117—135.5 |
| 3,348,963 | 10/1967 | Fukushima et al. | 117—63 |
| 3,424,604 | 1/1969 | Fukushima et al. | 117—63 X |

FOREIGN PATENTS 622,884   6/1961   Canada.

WILLIAM D. MARTIN, Primary Examiner

M. R. LUSIGNAN, Assistant Examiner

U.S. Cl. X.R.

117—76, 124, 135.5, 138.8, 140, 161